(12) United States Patent
Deshpande et al.

(10) Patent No.: US 11,960,579 B2
(45) Date of Patent: Apr. 16, 2024

(54) SMART GLASS AND BLOCKCHAIN DIGITAL SIGNATURE IMPLEMENTATION

(71) Applicant: Bank of America Corporation, Charlotte, NC (US)

(72) Inventors: Nimish Ravindra Deshpande, Mumbai (IN); Jyoti Kumar, New Delhi (IN); Kumari Priya, Gurgaon (IN)

(73) Assignee: Bank of America Corporation, Charlotte, NC (US)

( * ) Notice: Subject to any disclaimer, the term of this patent is extended or adjusted under 35 U.S.C. 154(b) by 329 days.

(21) Appl. No.: 17/673,980

(22) Filed: Feb. 17, 2022

(65) Prior Publication Data

US 2023/0259592 A1    Aug. 17, 2023

(51) Int. Cl.
   *G06F 21/31*    (2013.01)

(52) U.S. Cl.
   CPC .................... *G06F 21/31* (2013.01)

(58) Field of Classification Search
   CPC ........... G06F 21/31; G06F 21/32; G06F 21/64
   See application file for complete search history.

(56) References Cited

U.S. PATENT DOCUMENTS

| | | | |
|---|---|---|---|
| 9,331,856 B1 * | 5/2016 | Song | G06F 21/36 |
| 11,170,092 B1 * | 11/2021 | Liang | H04L 9/0637 |
| 11,223,481 B2 * | 1/2022 | Adluri | H04L 9/3247 |
| 11,790,067 B1 * | 10/2023 | Lindley | H04L 9/3231 |
| | | | 713/182 |
| 2018/0158034 A1 | 6/2018 | Hunt et al. | |
| 2019/0372769 A1 * | 12/2019 | Fisher | G06K 7/1417 |
| 2020/0042721 A1 * | 2/2020 | Castinado | H04L 9/0637 |
| 2020/0258176 A1 * | 8/2020 | Gibson | G06Q 10/103 |

(Continued)

FOREIGN PATENT DOCUMENTS

| | | |
|---|---|---|
| CN | 107171829 | 12/2019 |
| CN | 107833060 | 12/2020 |

(Continued)

OTHER PUBLICATIONS

"Is There Any Program That Can Turn Some Binary Code Into Binary String in a Black and White Image?" https://forums.tomsguide.com/threads/is-there-any-program-that-can-turn-some-binary-code-into-binary-string-in-a-black-and-white-image.430530/, Tom's Guide Forum, Jun. 16, 2018.

(Continued)

*Primary Examiner* — James R Turchen
(74) *Attorney, Agent, or Firm* — Weiss & Arons LLP

(57) ABSTRACT

Aspects of the disclosure relate to using smart glass and distributed ledger technology to provide secure authentication for digitally hand signing documents. Smart glasses worn by a customer may be activated via an application on a mobile device. The smart glasses may then scan the document and a biometric feature of the customer. The captured biometric feature and document content may be stored on a distributed ledger system. Based on the information stored on the distributed ledger, a unique binary code may be generated. The binary code may be converted into an image and shared with the mobile application. The image may then be embedded into the document as a digital hand signature. The document and the embedded image may be submitted to nodes of the distributed ledger for authentication of the digital hand signature.

16 Claims, 4 Drawing Sheets

(56) References Cited

U.S. PATENT DOCUMENTS

| | | | | |
|---|---|---|---|---|
| 2021/0281421 A1* | 9/2021 | Semenovskiy | ....... | H04L 9/3247 |
| 2022/0138769 A1* | 5/2022 | Olson | ....... | H04L 9/50 |
| | | | | 705/37 |
| 2022/0230263 A1* | 7/2022 | Fleck | ....... | G06Q 50/265 |
| 2023/0109544 A1* | 4/2023 | Fletcher | ....... | H04L 9/3226 |
| | | | | 713/168 |
| 2023/0231725 A1* | 7/2023 | Ammar | ....... | H04L 9/3247 |
| | | | | 713/176 |

FOREIGN PATENT DOCUMENTS

| | | |
|---|---|---|
| KR | 10-2020-0083932 | 7/2020 |
| TW | 201842463 | 12/2018 |
| WO | WO2019/072310 | 4/2019 |

OTHER PUBLICATIONS

"Image to Binary Converter-Online Picture to Array," https://www.dcode.fr/binary-image, Retrieved on Feb. 15, 2022.

"Base Online Base64 to Image Decoder/Converter," https://codebeautify.org/base64-to-image-converter, Retrieved on Feb. 15, 2022.

* cited by examiner

SMART GLASS AND BLOCKCHAIN DIGITAL SIGNATURE IMPLEMENTATION

FIELD OF TECHNOLOGY

Aspects of the disclosure relate to using smart glasses in combination with distributed ledger technology to implement a secure and unique digital signature process.

BACKGROUND

Currently, customers often affix hand or wet signatures to documents. For example, personal checks are typically hand signed. Even documents that are signed digitally may require a stylus and a touch sensitive screen to digitally capture a customer's hand signature. Thus, current methods for capturing a hand signature still require the customer to affix a hand signature.

It is technically challenging to verify a hand signature. Each hand signature, even if signed by the same customer, is different and must be confirmed independently. For example, a common method of authenticating a hand signature is to capture an initial copy of the customer's hand signature. Subsequently received hand signatures are compared to the initial copy. The comparison may be performed by human reviewers who, when evaluating authenticity of a hand signature, discount insignificant variations between the initial and subsequently received hand signatures. However, this manual authentication process may take 4 hours or more to complete.

Automated tools for verifying hand signatures may also be programmed to account for or discount variations in hand signatures. However, such automated tools may be over or under inclusive. If the automated tools are under-inclusive, a valid hand signature may be rejected as potentially fraudulent. If the automated tools are over-inclusive, invalid hand signature may be accepted.

Regardless of how hand signatures are captured or verified, the need to authenticate a hand signature injects an additional layer of costs and time delay into a workflow. On the other hand, because a hand signature involves the customer physically hand signing, a hand signature potentially provides personal confirmation and agreement to terms and conditions in a document.

It would be desirable to provide apparatus and methods for capturing a hand signature that does not inject time delay or require specialized equipment to capture the signature. It would also be desirable to provide apparatus and methods for verifying a hand signature that does not inject time delay or exhibit the technical challenges of conventional verification methods. Accordingly, it is desirable to provide SMART GLASS AND BLOCKCHAIN DIGITAL SIGNATURE IMPLEMENTATION.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
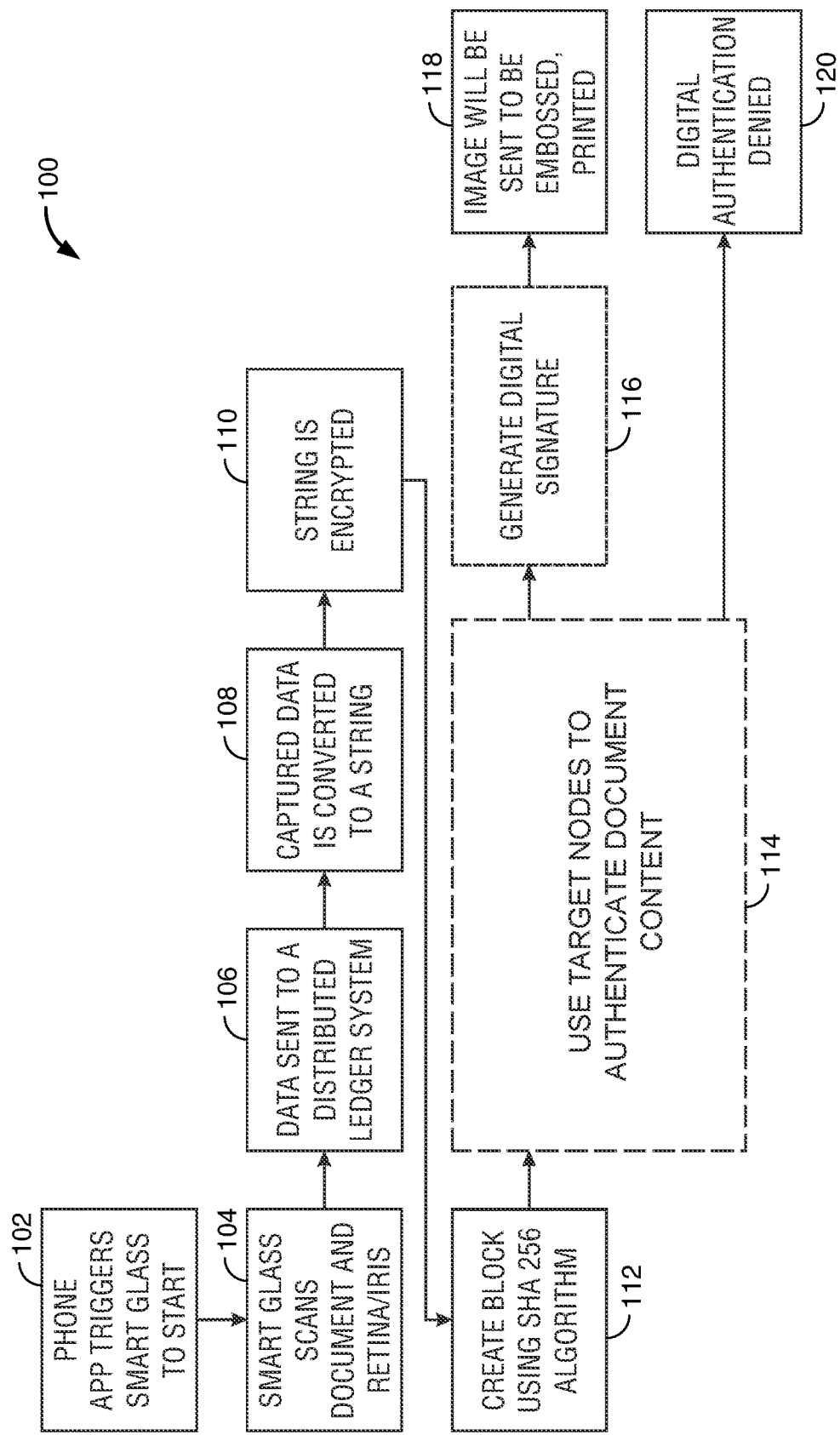
FIG. 1 shows an illustrative process and associated system architecture in accordance with the disclosure.

Apparatus and methods disclosed herein relate to intelligent smart glasses that may be worn by a customer. The smart glasses may be used to digitize a document. The smart glasses may be used to apply a digital hand signature to the digitized document. For the purposes of this disclosure, smart glasses may be understood to mean wearable glasses including one or more internal processors. The one or more internal processors may include one or more microprocessors. In addition to the processors, the smart glasses may also include hardware components associated with conventional glasses. Such components may include a frame and lenses.

Other components of the smart glasses may include one or more electronic displays, one or more cameras, one or more audio input devices, one or more audio output devices and/or one or more wired and/or wireless communication circuits. The communication circuit may provide cellular or other (e.g., Bluetooth®, Wi-Fi, Beacon®) telecommunication capabilities. Various sensors may be included in the smart glasses. These sensors may include a global positioning system ("GPS") receiver, a moisture sensor, a voltage meter, an accelerometer, a gyroscope, a touch pad and any other suitable sensors.

The smart glasses may include a network interface card. The network interface card may establish communication with a network. The network interface card may be operable to transmit data over a wireless communication channel. The network interface card may be operable to transmit data over a wired communication channel. The data may be transferred over the network to a remote server or other destination. A location of the smart glasses may be determined using GPS coordinates or cellular triangulation techniques.

The processor(s) of the smart glasses may execute one or more software modules. Software modules may be stored in a memory located within the smart glasses. Software modules may, in the alternative, be referred to as applications. Applications, when executed by the processor(s), may enable the smart glasses to perform various tasks and functions. Exemplary applications may include video/image capture, customer identity authentication, navigation, object recognition and running artificial intelligence ("AI") computational models.

The display of the smart glasses may present information alongside the physical environment the customer sees through the lenses. The display may be physically configured to add data alongside or overlaid on the physical environment the customer sees through the lenses. Such a display may be referred to herein as a "heads up display" or "HUD." A HUD may present information to the customer in a manner that does not require the customer to turn away from a viewpoint seen through the lenses.

In some embodiments, the HUD display of the smart glasses may project data as an at least partially transparent overlay onto the lenses. In some embodiments, the projected overlay may not be transparent. A customer wearing the smart glasses may view the physical environment normally seen through lenses in addition to the data included in the overlay.

The smart glasses may include a battery. The battery may be operable to power hardware components of the smart glasses, such as the sensors, the microprocessor, the display and the network interface card. The smart glasses may include any suitable power supply. The smart glasses may include a solar panel and may be connectable to other power sources.

The smart glasses may be operable with distributed ledger system. A distributed ledger system may provide a distributed, immutable, transparent, secure and auditable ledger of records. A complete copy of records stored on the distributed ledger system may be stored on multiple computer systems. Each computer system that stores a copy of the records may be a "node" of the system.

The distributed ledger system can be consulted openly and fully, allowing access to all records that have saved on the system since the first record ("genesis" record) of the system, and can be verified and collated by any entity at any time. The distributed ledger system may also store records in a fashion that prevents manipulation of the records.

A distributed ledger system may provide a secure way to store and process records among untrusted nodes on a network. A distributed ledger system may include a decentralized and tamperproof database. A distributed ledger system may include protocols that allows records to be verified by unreliable nodes. Records stored in a distributed electronic ledger system may only be added to the system when the nodes responsible for maintaining data stored by the system reach agreement in accordance with a consensus mechanism in effect for the system.

A distributed ledger system may store information in linked segments, or a chain of "blocks." The linked blocks may collectively form a "blockchain." Each block may be a target size (e.g., 100 megabytes) and store a threshold number of records. Each block may store a set of records performed at a given time or within a predetermined interval. Blocks are linked or chained to each other by a reference to the previous block. The blocks are linked to one another and secured using cryptography.

For example, each block in a distributed ledger system may be linked to a previous block using a cryptographic hash value generated based on previous records. For example, in a blockchain system, contents of a new block may be cryptographically linked to a hash value of a previous block. Any attempt to change or manipulate any record in a block may require changing the cryptographic hash values of all previous blocks in the chain. Accomplishing such a task may be computationally impossible even for modern day computer systems.

Security in a distributed ledger is accomplished by imposing strict rules and mutual agreement among nodes when attempting to add a new block of records to the distributed ledger system. The strict rules and mutual agreement protocols may be referred to as a consensus mechanism. The consensus mechanism synchronizes storage associated with the decentralized ledger system across all nodes that write records to the system. The consensus mechanism ensures that all nodes in the distributed ledger system agree on a single authoritative copy of records stored in the distributed ledger system. Nodes that write to the distributed ledger system may be programmed to recognize the largest repository of records (e.g., longest chain in a blockchain system) as the authoritative source of information for the distributed ledger system.

A key component of a consensus mechanism is proof of work. Each node that wises to store new records in the distributed ledger must successfully solve a computationally intensive task before being authorized to add the new records. The proof of work is typically complex to solve and at the same time easily verifiable by other nodes once completed. This dichotomy ensures that only one node is authorized to add new records and that all other nodes can easily verify that the new records have been properly linked to prior records. The computationally intensive nature of the block generation process provides tamperproof and auditable storage of records.

It is computationally expensive for a malicious attacker to modify records and attempt to corrupt their contents. The rest of the trusted nodes on the network would continuously generate new records, outrunning the attacker in the process of added new records to the ledger system. Therefore, a trusted branch of blocks or other repository of records will grow faster than any new records generated by the attacker. Nodes on a network are programmed to recognize the largest record repository on the network as the authoritative source of information. The nodes on the network will therefore invalidate any smaller repositories created by the attacker.

In order for a manipulated record to be successfully added to the distributed ledger system, it would be necessary for the malicious attacker to solve the proof of work faster than the rest of nodes on distributed ledger system. On distributed ledger system, this is structured to be computationally too expensive for the attacker. Accomplishing this feat requires having control of at least 51% of the computing resources in the distributed ledger system. The distributed ledger system may use any suitable consensus mechanism such as Proof of Work, Proof of Stake or Practical Byzantine Fault Tolerance. Each record may be authenticated by a consensus mechanism.

The distributed ledger may be a public or un-permissioned distributed ledger. A public distributed ledger does not have restrictions on nodes that may participate in the establishing a consensus for storing a new record on the distributed ledger system. The distributed ledger system may be a private or permissioned distributed ledger system. A private distributed ledger system has restrictions on nodes that may participate in the consensus mechanism for storing a new record on the system.

The distributed ledger system may utilize a combination of private and public nodes to execute a consensus mechanism. For example, the distributed ledger system may require a threshold number of private and/or public nodes to vouch for a record before storing the record on the system. Utilization of private nodes may allow for adding or rejecting a new record faster than wholly public systems.

Smart glasses worn by a customer may be activated via an application running on a mobile device of a customer. The mobile device may be linked or paired to the smart glasses. The mobile device and smart glasses may communicate using illustrative protocols such as Bluetooth, Wi-Fi, and near field communication ("NFC"). In some embodiments, the smart glasses may be directly activated by the customer. For example, the customer may activate the smart glasses with a touch-based input signal.

After being activated, the smart glasses may scan and a document the customer wishes to hand sign. The smart glasses may capture contents of the document. Illustrative captured contents may include name of customer, type of document, date of document, number of pages in the document and document text. The content of the document may be capturing using a camera of the smart glasses.

The camera may also capture a biometric feature of the customer. Illustrative biometric features may include a retina or iris scan. In some embodiments, a first camera of the smart glasses may capture the document contents. A second camera may capture the biometric feature of the customer.

The captured biometric feature and document contents may be transmitted by the smart glasses to a node of a distributed ledger system. The distributed ledger system may be a private or permissioned distributed ledger. The smart glass may transmit the captured information to a target node. The target node may be identified based on the captured document content. For example, the target node may be operated by an entity that generated the document. In some embodiments, the smart glasses may transmit the captured information to a designated central node. The central node may coordinate activity of all other nodes on a distributed ledger system.

The node on the distributed ledger that receives the captured document information may convert the received document content and biometric feature into a text string. The content and biometric feature may be converted into a text string using a binary-to-text encoding scheme such as base64. After the text string created, it may be encrypted. An illustrative scheme for encrypting the text string. Fernet is an illustrative example of symmetric (or "secret key") cryptography that may be used to encrypt the text string.

After encrypting the text string, a hash value may be generated for the encrypted string. The hash value may be generated by a node on the distributed ledger system. The hash value may be generated using a Secure Hash Algorithm ("SHA") such as SHA-256. A hash value may be generated using a mathematical hash function takes a variable number of characters and converts them into a string having a fixed number of characters. Even a small change to an input string creates a completely different hash value. The greater the number of input values the more difficult it becomes to generate a duplicate hash value. Further restrictions on a format of the desired hash value may create difficulty for even modern-day computer systems to generate a duplicate hash value. An exemplary format restriction may include adding a nonce value to any generate hash value. An exemplary nonce value may include requiring the generated hash value end in two zeros.

A target node on the distributed ledger may be selected to generate the hash value. The target node may be selected by the central node. The target node may be selected based on the captured contents of the document. For example, if the captured contents indicate that the document originated from a target entity, the selected target node may be a node that is operated by the target entity. The originating entity may be determined based on scanned contents of the document.

If a target entity cannot be identified based on the captured contents, the customer may be prompted to manually select the target node from given set of nodes available on the distributed ledger system. In some embodiments, if a target entity cannot be identified, a central node may autonomously assign the target node. The system may require selection of a threshold number of nodes.

The hash value generated by the target node may be computed based on the encrypted text string and prior data (e.g., blocks) stored in the distributed ledger. Utilizing the prior data to generate the hash value further increases the difficulty of generating a duplicate hash value for new content. The generated hash value may be a unique binary code. The generated hash value may be converted into an image. The image may be transmitted to a mobile device of the customer. The image may be transmitted to smart glasses worn by the customer.

Instead of hand signing the document, the customer may digitally apply the image (generated based on the hash value) to one or more pages of the document. In some embodiments, the customer may digitally hand sign the document by applying the generated hash value itself (as opposed to the image) to one or more pages of the document. Based on the number of pages in the captured document content, the image will only be available for application to the number of pages in the document.

After the document is digitally hand signed (using the image or hash value), the signed document may be authenticated by using a decryption application. The decryption application may be run on a node of the distributed ledger system. For example, the decryption algorithm may be run by the central node or a target node on the distributed ledger system. The decryption application may extract the image applied by the customer to each page of the hand signed document.

The decryption application may covert the extracted image back into the hash value. The image may encode the hash value based on color, contrast, skew, blur, sharpness, hue, tint, brightness, shade, shape, gradient, tone, saturation or any other property of the image. The hash value encoded in the image may be circulated to a subset of nodes for authentication. The nodes in the subset may apply a consensus mechanism to authenticate the distributed hash value.

Each of the nodes in the subset may include a copy of all information stored in the distributed ledger. Based on the local copy of the distributed ledger, each node in the subset may be capable of authenticating that the circulated hash value corresponding to the image has been validly generated by a node on the distributed ledger system. Based on the local copy of the distributed ledger, each node in the subset may be capable of authenticating that the circulated hash value corresponding to the image has been validly generated based on data validly stored on the distributed ledger system.

For example, each node executing the consensus mechanism may confirm that based on one or more records stored within the distributed ledger system, the circulated hash value does in fact correspond to an image or other information previously stored on the distributed ledger system. In the consensus mechanism fails, the document will be flagged as being fraudulently signed.

Methods for blockchain authentication of a hand signed document is provided. Methods may include capturing contents of a document using smart glasses. The contents of the document may be scanned using a first camera of the smart glasses. Methods may include capturing a biometric feature of a customer using the smart glasses. The biometric feature may be captured using a second camera of the smart glasses.

Methods may include transmitting the captured document contents and the captured biometric feature to a distributed ledger system. The distributed ledger system may include a central node. The distributed ledger system may include a plurality of secondary nodes. A consensus mechanism may be executed by the secondary nodes to identify the central node. Based on the captured document contents, methods may include selecting a subset of nodes to authenticate the document. The subset may include nodes that are operated by entities that contributed content to the scanned document.

Methods may include generating a hash value based on the captured document contents. The hash value may be generated by a target node. The target node may be one of the nodes included in the subset. The target node may be a node that is operated by an entity that contributed content to the scanned document. The hash value may be generated based inputting the captured document content, the biometric feature and one or more other records stored on the distributed ledger system into a hash function. A target node may store a local copy of the records included in distributed ledger system.

Methods may include converting the hash value into an image. Methods may include customizing a size of the image based on the captured document content. For example, the image may be pre-defined size that fits within a margin of the document. The image may be a machine-readable code that is scannable by a camera of the smart glasses or other mobile device.

Methods may include applying the image to one or more pages of the document. Applying the image to the document may correspond to digitally hand signing the document. For example, the customer may issue instructions to imbed the image in one or more pages of the document. The application of the image to the one or more pages may correspond the customer digitally hand signing the document.

Methods may include converting the captured document contents into a text string. Methods may include encrypting the text string. Methods may include generating a hash value and a corresponding image based on the encrypted text string. Generating the hash value based on the encrypted text may further secure the hash value and reduce likelihood of any other text string being used to generate a duplicative hash value.

Methods may include selecting a target node to generate the hash value. The target node may be selected based on determining whether the captured document contents have been generated by the target node for the customer. Methods may include, before generating the hash value, receiving approval from each node in the subset for the target node to generate the hash value. A consensus mechanism may be applied to ensure that each node in the subset has approved generation of the hash value by the target node.

Methods may include presenting the captured document contents to each member of a subset of nodes for preapproval of the captured document contents. For example, the subset of nodes may verify that the document contents have been previously, and validity stored on the distributed ledger system. A consensus mechanism may be applied to ensure that each node in the subset has approved the document contents.

Methods may include receiving a rejection of the document contents from at least one node in the subset. For example, one node may determine that the scanned document contents do not conform to a format or substance contributed by the one node to the document. The one node may compare the scanned content to other content previously stored within the distributed ledger. In response to receiving the rejection, methods may include flagging the document as fraudulent before generating the hash value.

After the hash value is successfully generated, the generated hash value may be provided to the customer. The central node may transmit the generated hash value to the smart glasses or other mobile device of the customer. The hash value may be provided to the customer via a secure application running on a mobile device. The secure application may also be an application that provides secure access to an online banking portal.

Using the secure application, the customer may digitally hand sign the document by embedding the received hash value into the document. Methods may include receiving a copy of the document hand signed by the customer using the hash value. Methods may include authenticating the hand signed copy of the document received from the customer by submitting the hand signed copy of the document to multiple nodes for authentication. Each node in may verify that the document includes the hash value validly generated by the target node based on other data stored on the distributed ledger system.

Each node in the subset may verify that the digitally signed document includes at least one embedded instance of the hash value validly generated by the target node. Each node in the subset may validate the hash value embedded in the digitally signed document. For example, each node may attempt to regenerate the hash value based on contents of the document and other information stored on the distributed ledger system. A consensus mechanism may ensure that all nodes in the subset authenticate the hash value.

Captured document content may include a first number of pages in the scanned document. Methods may include flagging the document as fraudulent when the hash value (or image corresponding to the hash value) has been applied to a second number of pages that is different than the first number of pages. The discrepancy in the number of pages may indicate that the signed document does not include the same number of pages that were originally scanned by the smart glasses.

A document may be a first document and the hash value may be a first hash value. Methods may include generating the first hash value based on a second hash value generated for a second document. The second document may be a signed document that has been previously authenticated by the distributed ledger system. The second document may have been successfully authenticated and stored on the distributed ledger system. The first hash value may be generated after the second hash value.

An artificial intelligence ("AI") system for authenticating a hand signed document is provided. The system may include smart glasses. The smart glasses may include a heads-up display. The smart glasses may include a first camera. The first camera may be oriented to scan a document as the document is being read by a customer wearing the smart glasses. The smart glasses may include a second camera. The second camera may be oriented to capture at least one biometric feature of the customer. The second camera may be oriented to capture at least one biometric feature as the customer is reading the document.

The smart glasses may include a processor. The processor may execute an application that initiates a workflow that requires a hand signed copy of the document. The smart glasses may receive customer input. For example, the smart glasses may include a touch pad or other input device. The customer may instruct the smart glasses to apply an image to each page of the document. The customer may instruct the smart glasses to generate a digitally hand signed copy of the document by embedding the image on at least one page of the document.

The smart glasses may include a communication circuit. The communication circuit may transmit the digitally hand signed copy of the document. The smart glasses may transmit the digitally hand signed copy of the document to a distributed ledger system. The distributed ledger system may include a plurality of nodes. The distributed ledger system may receive the digitally hand signed copy of the document. The distributed ledger system may receive a biometric feature captured by the smart glasses.

The distributed ledger system may extract the image applied to the at least one page of the digitally hand signed document. The distributed ledger system may convert the extracted image into a binary string. The distributed ledger system may pass the binary string to a subset of nodes. The subset of nodes may authenticate the binary string corresponding to the image.

In response to receiving authentication of the binary string from each node of the subset, the distributed ledger system may authorize completion of the workflow initiated by the customer on the smart glasses. Authentication of the binary string may correspond to verification of the digital hand signature applied by the customer to the document. In response to receiving a rejection of the binary string from one node of the subset, the distributed ledger system may issue an instruction that suspends the workflow and flags the digitally hand signed copy of the document as fraudulent or fraudulently signed.

The distributed ledger system may identify the subset nodes based on the workflow initiated by the customer and scanned content of the document. The distributed ledger system may identify the nodes of the subset based on contents of the document. For example, the distributed ledger system may identify the nodes of the subset based on nodes that are operated by entities that contributed content to the document digitally hand signed by the customer.

Each node in the subset may independently validate the binary string (created based on the image). Each node in the subset may validate the binary string by determining whether the binary string corresponds to a hash value generated based on an image embedded in one or more pages of the hand signed document. For example, each node may attempt to independently generate the hash value corresponding to the image detected in the document based on one or more records previously stored on the distributed ledger.

In some embodiments, a unique hash value may be embedded on each page a document. A unique hash value may be computed for each page of the document based on the hash value generated for one or more prior pages of the document. For example, the hash value for pagers of the document may be generated based on the hash value generated for $page_{n-1}$ of the document. The hash value for pagers may be generated based on the hash value of $page_0$ through $page_{n-1}$. In some embodiments, the hash value for a document may be generated based on a plurality of hash values previously computed for other documents.

A distributed ledger system is provided. The system may include a plurality of nodes. The plurality of nodes may authenticate a digitally hand signed document. The system may include computer executable instructions. The computer executable instructions when executed by a processor may perform one or more functions for authenticating a digital hand signature applied to the document.

The functions performed by the computer executable instructions may include receiving a digitized copy of a document. The document may be digitally scanned by a camera of smart glasses worn by a customer that desires to sign the document. The computer executable instructions may assign a target node to compute a hash value for the document.

The target node may compute the hash value based on content of the document and a number of pages in the document. The hash value for the document may be computed based on the content of the document, the number of pages in the document and a biometric feature of a customer expected to hand sign the document. The hash value for the document may be computed based on hash values associated with other records previously stored on the distributed ledger. In some embodiments, the computer executable instructions may compute the hash value. The computer executable instructions may be executed by a processor of the target node.

The computer executable instructions may convert the hash value into an image. The computer executable instructions may authenticate a digitally hand signed document by confirming that each page of the digitally hand signed document includes an embedded copy of the image. The computer executable instructions may select a subset of the nodes for authenticating the digitally hand signed document. The subset may be formed based on the content of the document. The computer executable instructions may authenticate the digitally hand signed document by receiving confirmation from each node in the subset that each page of the digitally hand signed document includes a copy of the image.

The computer executable instructions may flag the digitally hand signed document as fraudulent. The digitally hand signed document may be flagged as fraudulent in response to receiving a rejection from one node in the subset that a page of the digitally signed document does not include the image or does not include an image that encodes a hash value computed for the document.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative process and associated system architecture 100. At step 102, an application running on a mobile device of a customer activates smart glasses worn by the customer. At step 104, the smart glasses scan a document that needs to be hand signed by the customer. At step 104, the smart glasses also capture a biometric feature that confirms an identity of the customer.

At step 106, the captured document content is transmitted to a distributed ledger system. The captured content may be transmitted to a node of the distributed ledger system. At step 108, the captured document content is converted into a text string. At step 110, the text string is encrypted. An illustrative encryption algorithm may include Fernet.

At step 112, a record including the captured document content is created within the distributed ledger system. The record may include additional information, such as the captured biometric feature. Step 112 shows that the record may be a "block" if the record is expected to be saved on a blockchain distributed ledger system.

Step 112 also shows that the record may be created by applying a SHA-256 encryption algorithm to the captured document content. The SHA-256 encryption algorithm may generate a hash value based on the captured document content. A hash value is typically a string of numbers and letters, produced by a hash function. A hash function, such as SHA-256, is a mathematical function that takes a variable number of characters (e.g., the captured document content)

and converts it into a string with a fixed number of characters. Even a small change in the input string will generate a different hash value.

Before a new record is stored on the distributed ledger system, the new record must be verified. Step 114 includes verifying the document content. In some embodiments, the new record will be verified by a target node. In some embodiments, the new record may be verified by a subset of nodes. Each of the nodes tasked with verifying the new record will check validity of the captured document content. For example, the nodes may verify that the captured document content corresponds to a document that has been previously saved on the distributed ledger system. The nodes may confirm that the captured document content has been generated by a target node on the distributed ledger system.

Validating the new record may include electronically polling the nodes to determine whether the nodes vouch for adding the new record to the distributed ledger system. Some nodes may determine that the new record is valid and should be added to the distributed ledger. Other nodes may determine that the new record is invalid and should be rejected. Each node may be a computer. Each node may store a copy of the entire distributed ledger system.

A consensus mechanism may coordinate the electronic polling and ensure there is agreement among the nodes before a new record is added to the distributed ledger system. At step 120, if the new record is rejected, digital authentication of the captured document content is rejected. If the new record is rejected, the customer may need to hand sign the document in a conventional manner using a wet signature.

The consensus mechanism may select one or more nodes that will participate in the electronic polling. The consensus mechanism may select a node that participates in the electronic polling based on the captured document content. For example, if the captured document content indicates the document was issued by a bank (e.g., a request to open a new account), the subset of polled nodes may include a target node operated by the bank. If the captured document content indicates that the document was issued by an insurance company (e.g., request for a new insurance policy) the subset of polled nodes may include a target node operated by the insurance company.

At step 116, after the new record that includes the captured document content has been added to the distributed ledger system, a new hash value is generated. The new hash value may also be generated using a SHA-256 function. The new hash value may be generated based on other data stored on the distributed ledger system. For example, the new hash value may be generated based on the hash value of the new record and a hash value of at least one additional record stored on the distributed ledger system. In some embodiments, the new hash value may be determined based on inputs that include all records stored on the distributed ledger system. In such embodiments, security of the new hash value may progressively get stronger as more records are added to the distributed ledger system.

Step 116 may include converting the new hash value into an image. Colors in the image may correspond to the new hash value. The image may be sized appropriately based on a format of the document. For example, the image may be sized to fit within a margin of the document and not obscure any contents of the document. For example, the image may be generated having a shape that fits into a corner of the document without obscuring text of the document.

At step 118, the generated image is transmitted back to the application running on the customer's mobile device that initiated process 100 (at step 102). After the image is received by the application, the customer may embed the image in the document as a digital hand signature.

Figure 2:
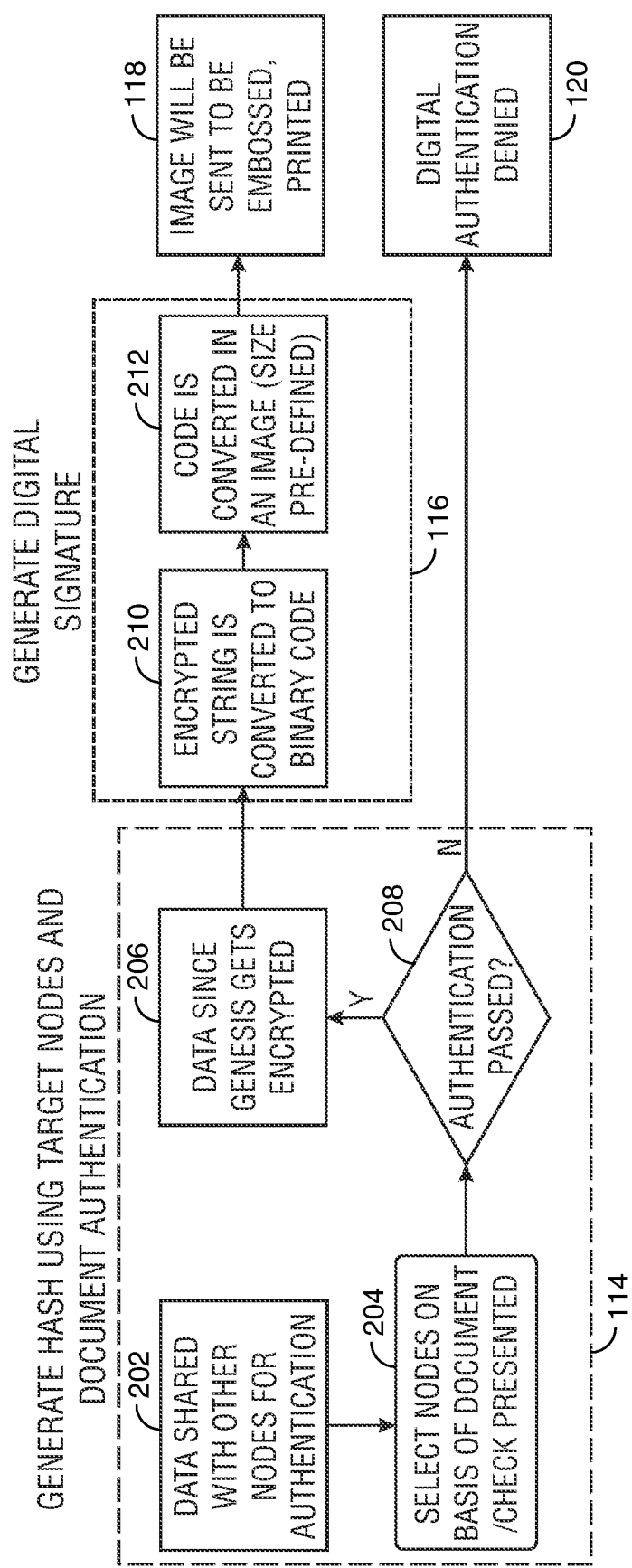
FIG. 2 shows an illustrative process and associated system architecture in accordance with the disclosure.

FIG. 2 shows illustrative sub-steps associated with steps 114 and 116 (shown in FIG. 1). FIG. 2 shows that step 114 may include sub-steps 202, 204, 206 and 208. At step 202, after a new record (including a new hash value for the record) is created at step 112 (shown in FIG. 1), the new record is shared with nodes of the distributed ledger system. At step 204, the nodes may be electronically polled, in accordance with a consensus mechanism to select a subset of the nodes that will be responsible for determining whether to add the new record to the distributed ledger system.

Step 204 shows that the subset of polled nodes may be selected based on captured document content. The subset of polled nodes may also be selected based on identity of the customer and type of document. For example, if the captured document content indicates the document was issued by a bank (e.g., a request to open a new account), the subset of polled nodes may include a target node operated by the bank. If the captured document content indicates that the document was issued by an insurance company (e.g., request for a new insurance policy) the subset of polled nodes may include a target node operated by the insurance company.

At step 208, the subset of polled nodes executes a consensus mechanism and electronically polls the nodes on whether to add the new record to the distributed ledger. If the subset of polled nodes rejects the new record, the process terminates at step 120. If the subset of polled nodes agrees to accept the new record, the process continues at step 206.

At step 206, data added to the distributed ledger prior to the new record is added to the distributed ledger system. The data may be encrypted before being added to the distributed ledger system. For example, on a private permissioned distributed ledger system, only authorized nodes may store, inspect, and view records on the distributed ledger system.

In some embodiments, the distributed ledger may only store records associated with a particular customer. Therefore, the quantity of data stored in a permissioned distributed ledger system may be limited so that encryption of the entire distributed ledger may occur within a reasonable amount of time (e.g., 5 minutes or less). The records may only be accessible to nodes authorized to take action on behalf of the customer. A node may be authorized in response to a customer logging on to an online banking portal using the node. The authorized node may part of the online banking portal.

FIG. 2 shows that step 116 includes sub-steps 201 and 212. At step 210, after the encryption of step 206, a new hash value is generated. The new hash value may be generated based inputting the encrypted data generated at step 206 to a hash function. The new hash value generated at step 210 may be based on the hash value determined at step 112. The new hash value generated at step 210 may be based on hash values of other records stored on the distributed ledger system. Generating the new hash value using the encrypted data generated at step 206 and/or other records may ensure that the hash value is different from the hash value generated at step 112 or any prior or subsequently generated hash value.

At step 212, the new hash value determined at step 210 is converted into an image. Step 212 may utilize a string-to-image converter available at https://codebeautify.org/base64-to-image-converter. Another illustrative string-to-image and image-to-string converter is available at https://www.dcode.fr/binary-image. At step 118, the image is sent to the customer. The generated image may have a pre-defined size. The pre-defined size may be determined based on the captured document content. At step 118, the customer may then embed the generated image into the document as a method of digitally hand signing the document.

Figure 3:
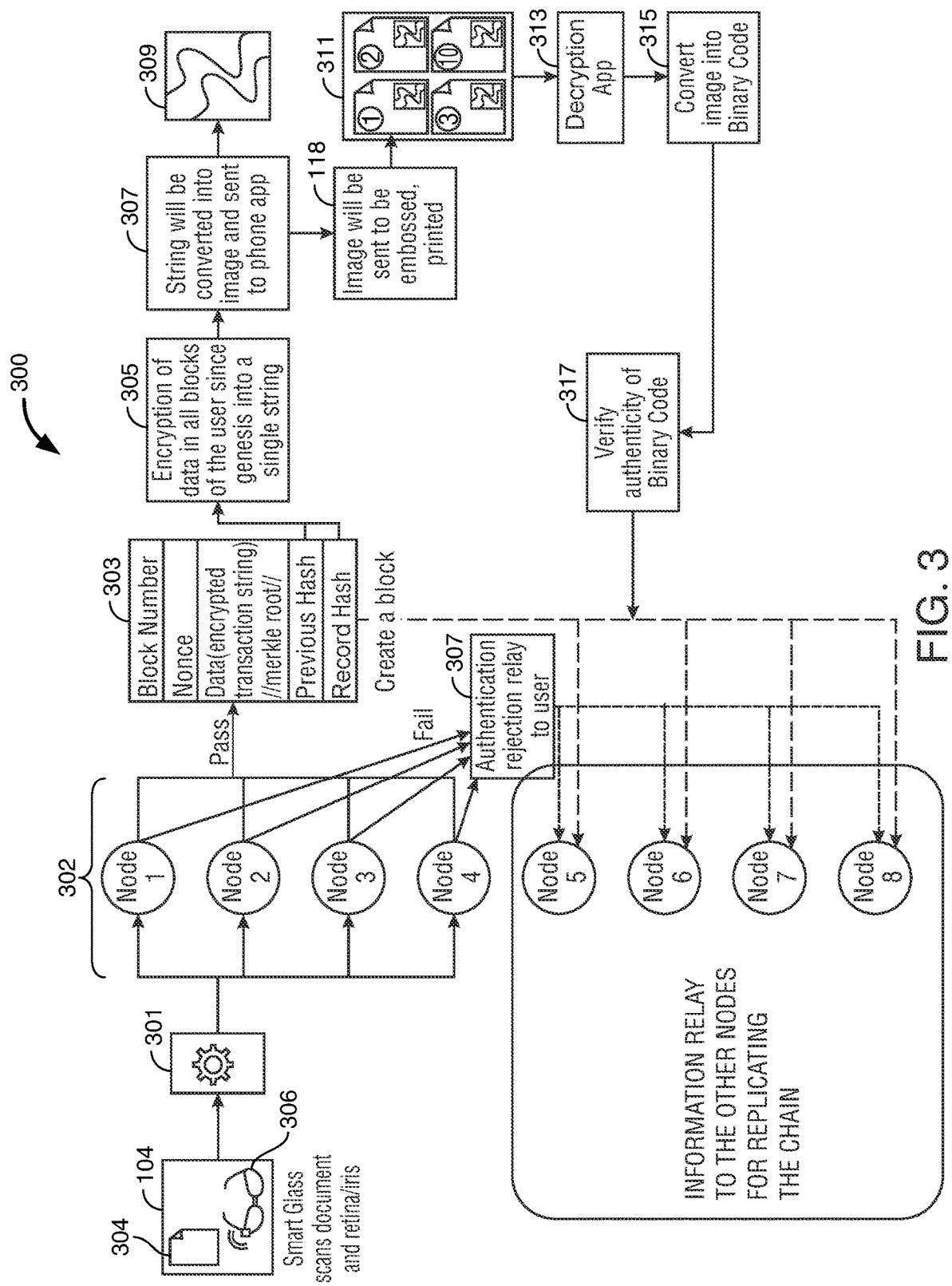
FIG. 3 shows an illustrative process and associated system architecture in accordance with the disclosure.

FIG. 3 shows process 300 and associated system components for digitally hand signing document 304 and authenticating the digital hand signature applied to document 304. For context, process 300 includes step 104 (shown and described in connection with FIG. 1) and step 301. Step 301 may include steps 106-112 for generating new record 303 based on content of document 304 captured by smart glasses 306 at step 104.

Distributed ledger system 302 includes nodes 1-8. A subset of nodes which includes $node_1$, $node_2$, $node_3$ and $node_4$ verify new record 303. Verification of new record 303 may determine whether new record 303 will be added to distributed ledger system 302. Illustrative new record 303 includes a block or record number. New record 303 includes a nonce. A nonce may be added to new record 303 to increase the difficulty of a computer system generating a duplicative hash value for new record 303. New record 303 also includes encrypted captured content of document 304 (described in connection with step 110 of FIG. 1).

New record 303 also includes a hash value of a previous record stored in distributed ledger system 302. The inclusion of the previous hash value causes the hash value of new record 303 to depend on the previous hash value, further increasing the difficulty of any computer system generating a hash value duplicative of the hash value assigned to new record 303. New record 303 also includes its own record hash value, generated at step 112 shown and described in connection with FIG. 1.

At step 305, the record hash value and previous hash value are combined into a single string. The single string of step 305 may be a concatenation of the previous and record hash values in new record 303. The single string of step 305 may be yet another hash value generated based on inputting the previous and record hash values into a hash function such as SHA-256. At step 307, the single string of step 305 is converted into image 309 and sent to a mobile device of the customer. The mobile device of the customer may be a tablet, laptop computer, smartphone, smart glasses 306 or any suitable mobile device.

As described in connection with FIG. 1, at step 118 the customer may embed image 309 into document 304 and thereby digitally hand sign document 304. Step 311 shows that image 309 has been applied by the customer to digitally hand sign document 304. Because image 309 has been generated based on two or more hash values, a computer system may not be able to duplicate the hash value represented by image 309. Based on the number of pages detected in document 304, image 309 may only be available for those many pages.

At step 313, the document 304 that now includes embedded image 309 is passed to a decryption application. The decryption application may be run on a mobile device of the customer. The decryption application may be run on a node of distributed ledger system 302. At step 315, the decryption application detects and extracts image 309 embedded in document 304. Step 315 also includes converting extracted image 309 into a binary code.

Image 309 may be converted into a binary code based on color, contrast, skew, blur, sharpness, hue, tint, brightness, shade, shape, gradient, tone, saturation or any other property of image 309. At step 317, $node_5$, $node_6$, $node_7$ and $node_8$ of distributed ledger system 302 executes a consensus mechanism to verify the binary code. If consensus is reached among $node_5$, $node_6$, $node_7$ and $node_8$ that image 309 extracted from document 304 is identical to the hash value associated with record 303, document 304 will be authenticated as having been duly hand signed.

On the other hand, if consensus is not reached among $node_5$, $node_6$, $node_7$ and $node_8$, then document 304 may be flagged as having been fraudulently signed. For example, if the customer attempts to embed image 309 in a different document that includes a different number of pages or different content than document 304, the discrepancy will be detected.

Figure 4:
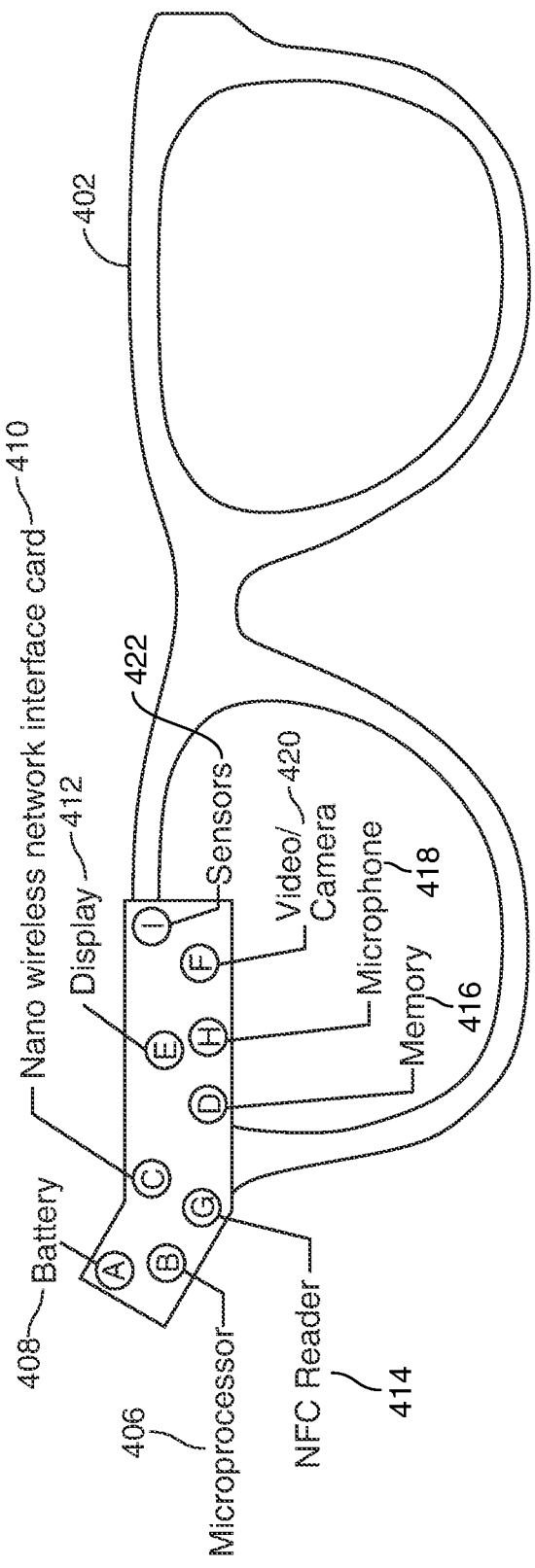
FIG. 4 shows illustrative apparatus in accordance with the disclosure.

FIG. 4 shows illustrative smart glasses 402 in accordance with the invention. Illustrative smart glasses 402 may include a plurality of hardware embedded in smart glasses 402. The plurality of hardware may include one, two, some, or all of hardware components A-I illustrated in FIG. 4, and, in some embodiments, additional hardware not included in FIG. 4 but described herein. Illustrative hardware components included in smart glasses 402 may include battery 408, microprocessor 406, NFC reader 414, nano wireless network interface card 410, display 412, sensors 422, video/camera 420, microphone 418 and memory 416.

Thus, methods and apparatus for SMART GLASS AND BLOCKCHAIN DIGITAL SIGNATURE IMPLEMENTATION are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for blockchain authentication of a digital hand signature, the method comprising:
    capturing contents of a document using smart glasses;
    capturing a biometric feature of a customer using the smart glasses;
    transmitting the captured contents and the captured biometric feature to a distributed ledger system comprising a plurality of nodes;
    based on the captured contents, selecting a subset of the plurality of nodes to authenticate the document;
    generating a hash value based on the captured contents, the captured biometric feature and records stored locally on a target node included in the subset;
    providing the hash value to the customer via a secure application running on a mobile device of the customer;
    receiving a digitally hand signed copy of the document from the customer; and
    authenticating the digitally hand signed copy of the document by each member of the subset verifying that each page of the document includes the hash value.

2. The method of claim 1 further comprising:
    converting the hash value into a binary string;
    converting the binary string into an image; and
    applying the hash value to each page of the document by embedding the image into each page of the document.

3. The method of claim 2 wherein the image is machine readable.

4. The method of claim 2 further comprising:
    converting the captured contents into a text string;
    encrypting the text string; and
    generating the image based on the encrypted text string.

5. The method of claim 1, further comprising selecting the target node based on determining whether the captured contents have been generated by the target node for the customer.

6. The method of claim 1 further comprising:
presenting the captured contents to each member of the subset of nodes for preapproval of the captured contents; and
before generating the hash value, receiving approval from each node in the subset to generate the hash value.

7. The method of claim 6 further comprising:
receiving a rejection of the contents from at least one node in the subset; and
in response to receiving the rejection, flagging the document as fraudulent before generating the hash value.

8. The method of claim 2, wherein the captured content comprises a first number of pages in the document and the method further comprises flagging the document as fraudulent after generating the hash value when a second number of pages that each include the image does not correspond to the first number of pages.

9. The method of claim 2 further comprising customizing a size of the image based on the captured contents.

10. The method of claim 1 wherein the document is a first document, and the hash value is a first hash value, the method further comprising generating the first hash value based on a second hash value generated for a second document;
wherein the first hash value is generated after the second hash value.

11. An artificial intelligence ("AI") system for authenticating a document, the system comprising:
smart glasses comprising:
a heads-up display;
a first camera that scans the document;
a second camera that captures at least one biometric feature of a customer while the first camera is scanning the document;
a processor that:
initiates a workflow that requires a hand signed copy of the document;
applies an image to each page of the document to generate the hand signed copy of the document; and
a communication circuit for transmitting the hand signed copy of the document; and
a distributed ledger system comprising a plurality of nodes, the distributed ledger system that:
receives the hand signed copy of the document and the biometric feature captured by the smart glasses;
extracts the image from each page of the hand signed copy of the document;
converts the extracted image into a binary string;
passes the binary string to a subset of the nodes for authentication of the binary string;
in response to receiving authentication of the binary string from each node in the subset, authorizes completion of the workflow on the smart glasses; and
in response to receiving a rejection of the binary string from one node in the subset, suspends the workflow and flags the hand signed copy of the document as fraudulent.

12. The AI system of claim 11 wherein the distributed ledger system selects nodes in the subset based on contents of the document.

13. The AI system of claim 11 wherein each node in the subset validates the binary string by computing hash values generated based on contents of each page of the document.

14. The AI system of claim 13, wherein the binary string comprises a unique hash value for each page of the of the document, and the unique hash value associated with $page_n$ of the document is computed based on the unique hash value associated with $page_{n-1}$ of the document.

15. The AI system of claim 13, wherein the binary string associated with the document is computed based on a plurality of hash values computed by a target node included in the plurality of nodes.

16. The AI system of claim 11, wherein the distributed ledger system computes the subset of nodes based on the workflow and content of the document.

* * * * *